(12) United States Patent
Singhal

(10) Patent No.: US 11,593,359 B1
(45) Date of Patent: Feb. 28, 2023

(54) SYSTEM AND METHOD FOR CONTEXT DRIVEN VOICE INTERFACE IN HANDHELD WIRELESS MOBILE DEVICES

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 502 days.

(21) Appl. No.: 15/477,079

(22) Filed: Apr. 1, 2017

Related U.S. Application Data

(62) Division of application No. 13/608,084, filed on Sep. 10, 2012, now Pat. No. 9,684,395.

(60) Provisional application No. 61/654,862, filed on Jun. 2, 2012.

(51) Int. Cl.
| | | |
|---|---|---|
| *G06F 16/242* | (2019.01) | |
| *G06F 16/22* | (2019.01) | |
| *G06F 16/248* | (2019.01) | |
| *G06F 16/683* | (2019.01) | |
| *G06F 16/951* | (2019.01) | |
| *G06F 16/2457* | (2019.01) | |
| *G06F 40/205* | (2020.01) | |

(Continued)

(52) U.S. Cl.
CPC ......... *G06F 16/2425* (2019.01); *G06F 3/167* (2013.01); *G06F 16/22* (2019.01); *G06F 16/243* (2019.01); *G06F 16/248* (2019.01); *G06F 16/24575* (2019.01); *G06F 16/24578* (2019.01); *G06F 16/683* (2019.01); *G06F 16/951* (2019.01); *G06F 40/205* (2020.01); *G06F 40/242* (2020.01)

(58) Field of Classification Search
CPC .... G06F 16/24; G06F 16/242; G06F 16/2423; G06F 16/243; G06F 16/2433; G06F 16/2452; G06F 16/2453; G06F 16/24534; G06F 16/27; G06F 16/22; G06F 16/683; G06F 16/24575; G06F 16/24578; G06F 16/951; G06F 16/248; G06F 3/167; G06F 17/2705; G06F 17/2735; G06F 40/242; G06F 40/205

See application file for complete search history.

(56) References Cited

U.S. PATENT DOCUMENTS

| | | | |
|---|---|---|---|
| 8,538,970 B1 * | 9/2013 | Tucker | G06F 16/24578 707/748 |
| 2004/0133559 A1 * | 7/2004 | DeVorzon | G06F 17/273 |
| 2005/0076003 A1 * | 4/2005 | DuBose | G06Q 30/02 |

(Continued)

OTHER PUBLICATIONS

Merriam-Webster, "Focus group Definition & Meaning". Merriam-Webster dictionary [online], [retrieved on May 3, 2022]. Retrieved from the internet (URL: https://www.merriam-webster.com/dictionary/focus%20group), Apr. 24, 2009 (Year: 2009).*

*Primary Examiner* — Daniel Samwel
(74) *Attorney, Agent, or Firm* — Davidson Berquist; Jackson & Gowdey LLP

(57) ABSTRACT

A sequence of context based search verb and search terms are selected via either touch or voice selection in a mobile wireless device and then a human articulated voice query is expanded using a culture and a world intelligence dictionary for conducting more efficient searches. Focus groups are used for populating prior query search databases for storage in the mobile wireless device that are organized by context based search terms in a mobile wireless device for efficient search.

17 Claims, 20 Drawing Sheets

(51) Int. Cl.
*G06F 40/242* (2020.01)
*G06F 3/16* (2006.01)

(56) References Cited

U.S. PATENT DOCUMENTS

| | | | | |
|---|---|---|---|---|
| 2006/0031207 | A1* | 2/2006 | Bjarnestam | G06F 17/277 |
| 2007/0174244 | A1* | 7/2007 | Jones | G06F 16/3326 |
| 2009/0089251 | A1* | 4/2009 | Johnston | H04N 7/163 |
| 2009/0327078 | A1* | 12/2009 | Ohazama | G01C 21/3682 |
| | | | | 705/14.54 |
| 2011/0184951 | A1* | 7/2011 | Paparizos | G06F 16/951 |
| | | | | 707/737 |
| 2012/0023120 | A1* | 1/2012 | Kanefsky | G06F 16/9574 |
| | | | | 707/767 |
| 2012/0232897 | A1* | 9/2012 | Pettyjohn | G06Q 30/0603 |
| | | | | 704/235 |
| 2013/0003088 | A1* | 1/2013 | Feng | G06F 3/1253 |
| | | | | 358/1.9 |
| 2013/0124474 | A1* | 5/2013 | Anderson | G06F 16/285 |
| | | | | 707/634 |
| 2013/0339380 | A1* | 12/2013 | Meschkat | G06F 16/3322 |
| | | | | 707/767 |

* cited by examiner 2B-1     2B-2

| Synonym dictionary 70 | |
|---|---|
| Closest | nearest |
| ...... | |

| Culture dictionary 72 | |
|---|---|
| Windy city | Chicago |
| Plastic | bankcard |
| Petrol station | gasoline |
| Beauty Shop | hair saloon |
| Best | five star |
| Good | three star |

| World Intelligence Dictionary 74 | |
|---|---|
| Convenience store | 7-11 store |
| Fast food | McDonald<br>Wendy's<br>In-n-out<br>Panda King |

Figure 5C

| As articulated query 62 | Synonym/Word Intelligence expanded query 64 |
|---|---|
| Best places to eat | best places/restaurants to eat |
| Closest convenience store | closest convenience/7-11 store |
| Closest fast food | closest/nearest/within one mile fast food |
| Fast food | wendy's/in-n-out/panda express/McDonald |
| Go There | Go/Drive/Directions there |
| Find It | Find/Search It |
| Club | Club/Saloon/Pub/Dance club |
| ...... | |
| ...... | |

Figure 5D

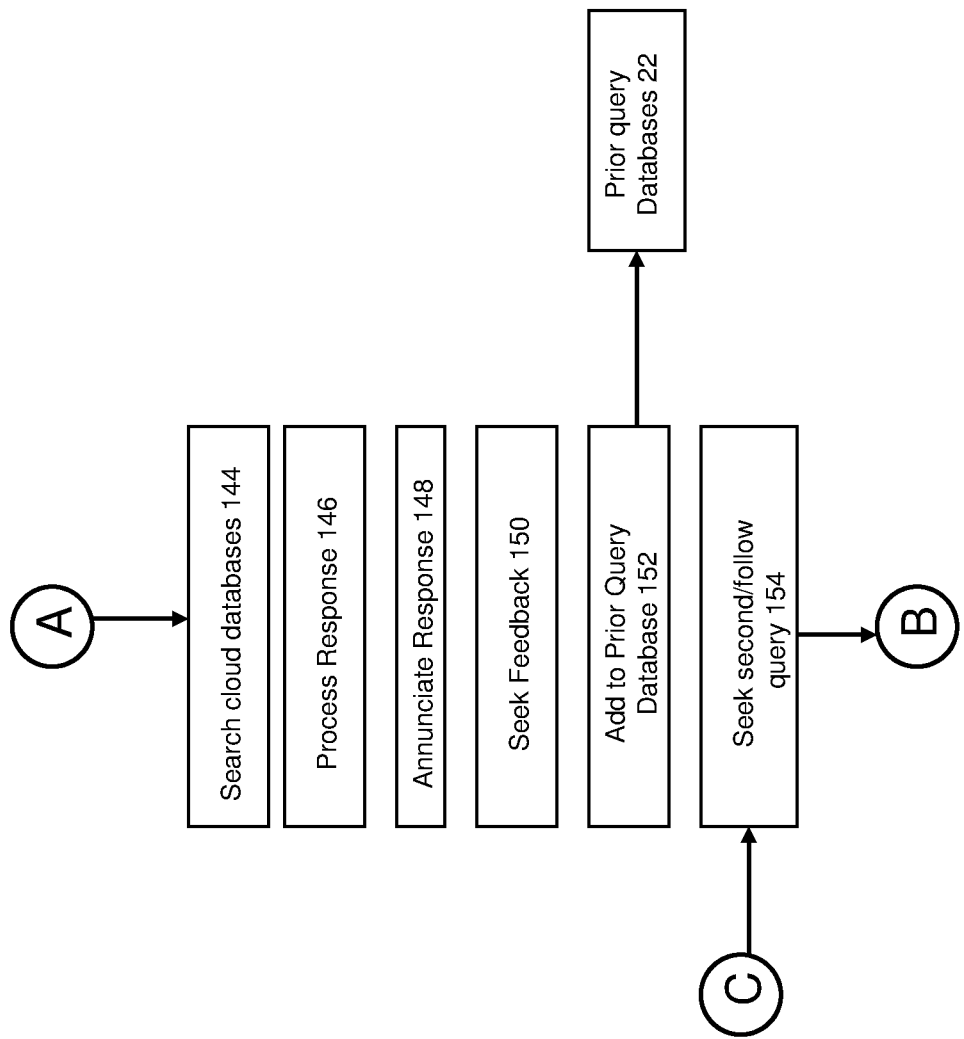

Travel 180A
  local
  foreign
  road
  air
  rail

Entertainment 180B
  movies
  performances
  .....

Food 180C
  restaurants

Money 180D
  Banks
  ATM

Employment 180E
  Companies

Stocks 180F
  Market

Shop sites 180G
  outlet malls

School Work 180H
  Primary
  Middle
  High

College 180J
  Community
  university
  Ivy league

Figure 10C

SYSTEM AND METHOD FOR CONTEXT DRIVEN VOICE INTERFACE IN HANDHELD WIRELESS MOBILE DEVICES

CROSS REFERENCE

This application is a divisional of application Ser. No. 13/608,084 filed on Sep. 10, 2012, of Tara Chand Singhal, titled, System and Method for Context Driven Voice Interface in Handheld Wireless Mobile Devices, which claims priority from Provisional application Ser. No. 61/654,862 filed on Jun. 2, 2012 of Tara Chand Singhal, titled, System and Method for Context Driven Voice Interface in Handheld Wireless Mobile Devices. The contents of application Ser. Nos. 13/608,084 and 61/654,862 are incorporated in their entirety herein by this reference.

FIELD OF THE INVENTION

A sequence of context based search verb and search terms are selected via either touch or voice selection in a mobile wireless device and then a human articulated query is expanded using a culture and a world intelligence dictionary for conducting more efficient searches. Focus groups are used for populating prior query search databases for storage in the mobile wireless device that are organized by context based search terms.

BACKGROUND

Human voice based commands to computer systems are a prior art technology and has been used in many applications. Some examples of voice based commands are in medical office, manufacturing operations, and warehouses. In such applications the voice command words are limited in number to match those on a list as may be used in that specific application. Hence the voice command terms are limited in number to be generally less than hundred.

The voice processing technology has seen great improvements with the ability to listen to large variety of spoken words and short sentences or phrases and recognize such spoken words and the sentences. There has also been great improvement in database technologies and using and searching such databases for vast depositaries of information. Lately a voice command application known as SIRI® has been added to iPhone 4S® from APPLE®.

In spite of these great improvements, it is cumbersome and difficult for a human to interact with databases where the interaction is in free form voice-based queries. The prior art voice processing logic has a difficult time in being able to properly parse the meaning of the free form voice queries that a user intends.

Hence, it is an objective of the embodiments herein to provide for systems and methods that improve the interface for such voice based free-form queries and interaction between people and vast databases that may be present in a cloud based service.

SUMMARY

There is vast amount of information that has been captured in the databases that is accessible over the Internet. Such information, it is believed, covers a large range of human endeavors. There are search engines, such as Google that can search these vast libraries of information by specifying queries using various search terms.

Lately there has been movement in the direction of using voice to interact with such vast amount of information. One example of that is availability of SIRI, a voice based interface on Apple IPhone 4S. There are a large number of words in English dictionary, approximately close to 100,000. However a small fraction of these large number of words are used by common people, perhaps such words number of the order of a few thousands and certainly much less then 10,000.

Also words may have multiple meanings and which one of these multiple meanings is meant depends upon the context in which the words are used. That is, the very same words may be used to mean a large variety of information depending on the context in which they are used.

Data storage, computer processing and interface technologies and their underlying hardware and software have advanced rapidly in the last decade or so that once unheard of capabilities are possible.

One such new concept in information storage is cloud based storage of vast amount of information. Another such concept is real time voice processing that could enable humans interacting and interfacing with such vast amounts of information through voice commands.

While voice command processing has been used in some applications that are limited to recognizing a few hundred key voice command terms, the underlying technologies make possible human interaction with such vast amount of information stored in cloud based servers.

Apple pioneered use of such voice based interface via a service called SIRI that was made available very recently in IPhone 4S. The embodiments described herein are intended to improve such voice based human interaction with the cloud based data depositaries through a mobile wireless device such as a smart phone.

The embodiments herein teach an interface processor and an interface function in a wireless mobile communication device that facilitates voice based human interactions with the cloud based data depositaries. The interface function requires that the voice based human interaction first identify a hierarchy of context driven verb and search terms under which a free form voice query is then made.

The embodiments herein teach a wireless communication device with a dual voice-input and display-touch interface, coupled with a search processor. The handheld wireless communication device has a user voice/touch interface processor that operates from the device memory and executes in the device processor.

The interface processor has an interface function that enables, in part (i) an either display-touch or a voice-input based interface, and in part (ii) only a voice-input based interface.

The interface function, in display-touch or voice-input interface part, (i) displays primary context search verbs on the device screen for a device user to make a touch/voice selection there from, and (ii) the interface function then displays secondary context search terms on the display screen for the user to select there from. Subsequent to these selections, a user in only a voice-input interface mode is enabled to voice a free-form query under the selected sequence of context search verb and the search term.

The interface function interfaces with a hierarchy of cloud based and local databases and moves data from the higher level of hierarchy to lower levels of hierarchy to provide a user an efficient interface for searching information databases with free-form voice queries.

The handheld wireless communication device has a search processor. The search processor, using the context-based query, searches device local libraries and cloud based databases and annunciates results in voice or displays text/image response on the device screen or in a combination of voice response and text/image display. Thus the interface function provides an efficient interface for access to information databases.

These and other aspects of the embodiments herein are further described in detail with the help of the accompanying drawings and the description, where similar number are used to identify the features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 5C-5D are examples of dictionaries and queries of the embodiments;

FIG. 8A-B is a logic flow diagram that illustrates operation of the embodiment and movement of data flow between databases;

DESCRIPTION

Introduction

Figure 1A:
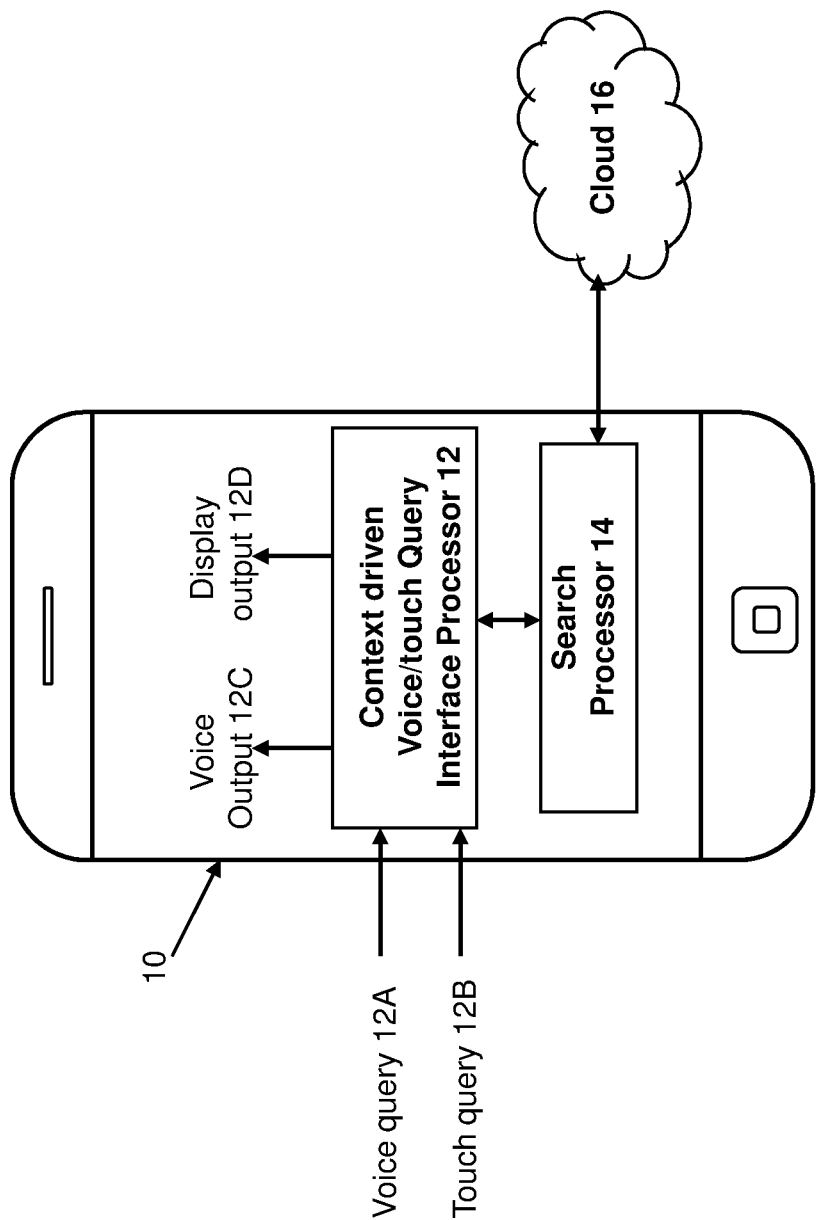
FIGS. 1A and 1B are block diagrams that illustrates features of the present embodiment of a context driven voice/touch processor.

Human interaction with cloud based computer systems and their vast data depositaries over the wireless internet as would be used with the help of mobile wireless devices for forming a voice query, searching the databases and understanding the response and to make such queries and responses relevant to the humans makes this endeavor a complex task.

A part of that complexity is driven by the requirement to be efficient for a real time response to queries formed by voice command. Another part of the complexity is lack of knowledge and structure of what exists out there and in what form to be able to form a meaningful and intelligence voice query. Third part of that complexity is how the actual human interface with the mobile device and indirectly with the cloud, is performed using available and pertinent human senses. These available and pertinent human senses are visual display, touch control input, voice-input, and hearing-sense as an output.

A fourth part of that complexity is that human beings are different from each other in many ways. These differences could be and are culture based, perception based, understanding based, intelligence based, and reaction based. As an illustration of this part of complexity, for some, a sentence displayed visually as a text is quicker to comprehend and understand than if spoken verbally, while for others a spoken sentence is quicker to comprehend and understand. Advances in software based systems and sensor related technologies are well suited to address such complex tasks.

In general for most humans, a word/phrase is quicker to comprehend when displayed on a screen, while for others is quicker to comprehend when heard as a voice. A picture is quicker to comprehend visually than if described verbally. However, a sentence based query is easier and faster to articulate when spoken than when typed in as text.

Therefore the embodiments herein teach a structured voice query and a structured response to such a query. Such a structured query and response of the embodiments herein via mobile wireless devices has many parts.

The first part of the structured query is in identifying the context of the query or the search via either touch or voice or a combination. The second part is articulating the query in a human's preferred format, manner, vernacular, and style. Such a query is called a human articulated query.

The third part is understanding by a processor, what the query means or how it relates to the data in the cloud servers and databases. The fourth part is refinement or confirmation of the intended query from the human user to achieve queries that are likely to result in meaningful responses. The fifth part is executing the query via a search engine, when the query and its answer may already exist in a prior query database under the specific context terms.

The sixth part is, if no prior similar query exists, to form a query under the context terms for the cloud databases with the knowledge of the types of databases in the cloud.

The seventh part is to process the query result by the processor for exposure to the human as either a display or voice or both and a structure of that response for easy and quick comprehension by the human.

The eighth part is seeking human feedback on if the resultant response was applicable and useful. The ninth part is collecting that feedback to update the prior query database and record intelligence for future queries specific to a human user as the mobile wireless devices are personal devices. As a simplified illustration, a human need not write down the result of the queries and the queries themselves and merely have them stored for easy access later on.

To optimize the voice based search response queries, the structured queries of the embodiments herein use a hierarchy of databases. The topmost hierarchy is the cloud database. This database is the master set of all data that may be ever used to answer a query and best maintained in the cloud databases. These databases are likely to be scattered in the Internet servers.

The second level is prior query databases based on prior similar queries of others and are also maintained in the cloud servers. In the alternative they may also be based in the wireless device of a user. A third level is query database that is maintained in the local wireless device. The last two of these three databases are structured in query-response structure, while the first is the depositary of all information organized as are prior art databases are along topics and subtopics and their keywords.

Generally a query is first resolved against the local database, and if a response not found then against the prior query global database. If a response is not found in these databases then the query answer is searched against the cloud database. The local database and the prior query databases are updated based on the query and responses that are retrieved and processed from the cloud database.

The embodiments described herein teach a structured query and a structured response to a query that may be a dialogue of many queries and responses via a wireless mobile device. The headings are provided for reader convenience.

Voice/Touch Command Interface Processor 12

As illustrated with reference to FIG. 1A, a voice/touch command interface processor 12 is operable in the memory and processor of a portable communication wireless device 10. The processor 12 is a combination of hardware and software where the hardware is operated by the specific software. The hardware and software of processor 12 interface with sensors for input and output of data. These sensors may be touch input and voice input and display output and voice output and may use text to speech conversion and speech to text conversion technologies. These specific technologies are considered prior art and no claim is made to such technologies except in the context they are used in the embodiments described herein.

The processor 12 may be part of an existing processor of the device 10 or it may be separate processor designed for this application depending on the processing requirements and speed of response to satisfy a human for a real time response.

The interface processor 12 receives either voice command query 12A or touch command query 12B or a combination of both such commands. In response to these commands, the interface processor 12 via search processor 14 searches for a result that may be present in cloud based service 16. The processor 12 annunciates the search results via voice output 12C or a display output 12D or a combination of both such outputs.

The device 10 has a search processor 14 that interfaces with the interface processor 12 and the cloud data system 16. The functions of the search processor 14 are to store information about the various databases and their metadata and to parse a search query to form search queries for these specific one or more databases.

A function of the interface processor 12 is also to receive and temporarily store the raw search results received from the search processor 14 and process such raw result to be meaningful to the human and articulate back to the human in a human-desired format.

As illustrated with reference to FIG. 1B, the device 10 also has a device database 18 with a local device library 18D. The database 18 also stores primary context verbs 18A, secondary context terms 18B and tertiary context terms 18C that enable a user to frame a voice/touch based query under the sequence of such search verbs and search terms. The device 10 has temporary memory (not shown) to be able to hold the formulated queries and their responses for reference and be able to access them by scrolling them from the temporary memory.

The device 10 also has a cloud interface 20 that interfaces with cloud 16 for sending queries under the context sequences. The cloud 16 provides for two different types of databases. One of these is cloud database 22 that is organized under the context search code sequences 23 illustrated as C1, C2 and C3 to store query-response structured data 25. The other of these databases is cloud extensive databases 24 that store all data organized as are the prior databases based on topics, subtopics and their keywords.

Context Driven Human Interface to Wireless Mobile Device

Figure 2A:
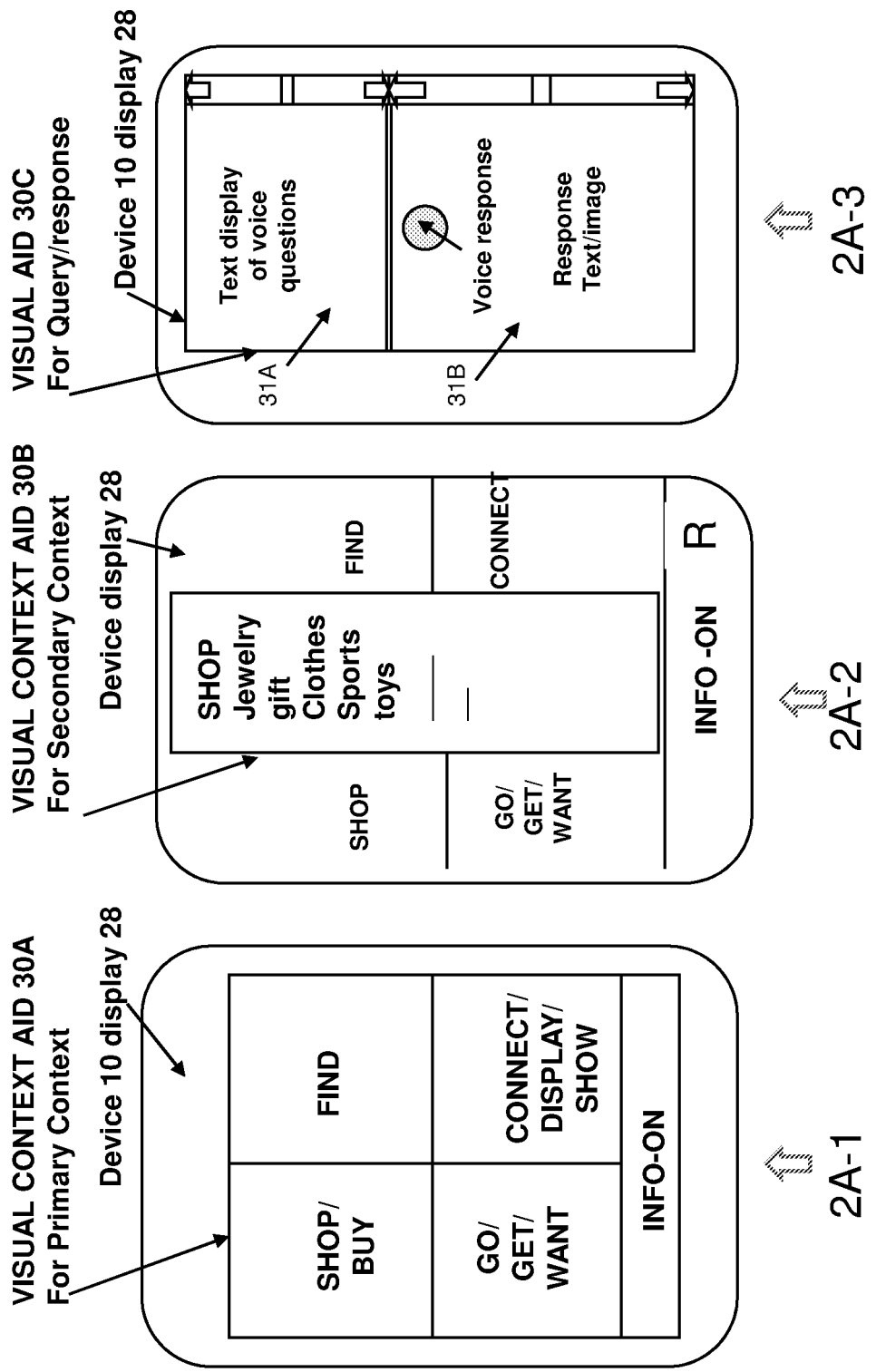
FIGS. 2A and 2B are block diagrams that illustrates features of the context driven interface screen for initiating a search.
Figure 2B:
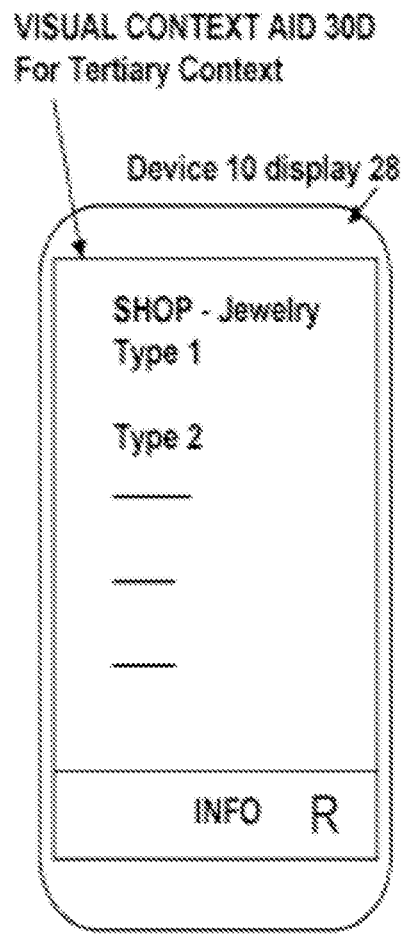
Figure 2B:
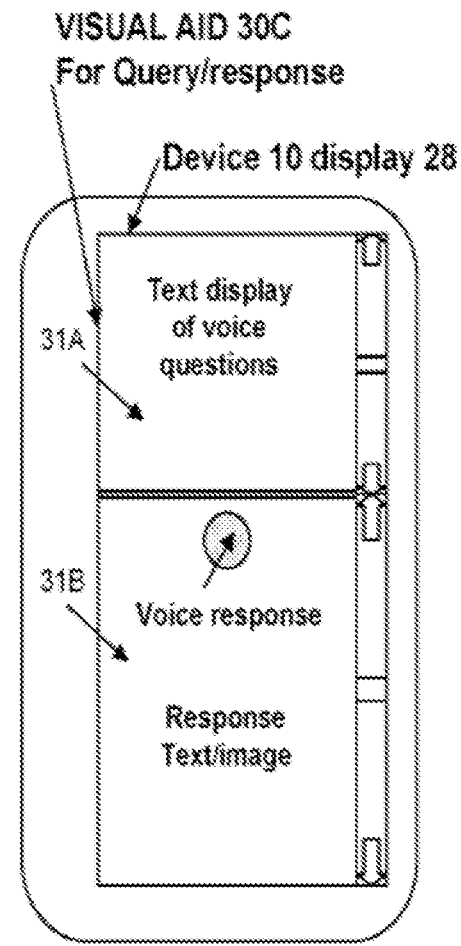

With respect to FIGS. 2A and 2B, the voice/touch interface to a wireless mobile device, implemented in the wireless device 10 is illustrated. Item 2A-1 displays a display screen 18 of the wireless mobile device 10 with the display of primary context search verbs 30A. The number of such verbs is preferably limited to be from 3 to 7 and each is preferably displayed in a box. Such a limitation on the number of primary context search verbs, it is believed, provides a human friendly interface to be able to quickly assimilate or comprehend the choices and make a quick selection there from.

These primary context verbs may be any words that represent the top level hierarchy of what a human may desire or want. As a simplified illustration these search verbs may be SHOP/BUY, FIND, GO/GET/WANT, CONNECT/DISPLAY/SHOW and INFO-ON. There may be different or other verbs than these, but these are representative and may also be preferred.

Item 2A-2 illustrates a display screen 28 with a list display of search terms 30B under one of these primary verb categories. The list display is preferably limited to have twelve or less items of display. If each of these search terms represents a large body of information, then a tertiary search term list 30D may be displayed as in item 2B-1. A list item limit of 12, it is believed, makes for easy comprehension and selection from that list and that too displayed on a limited size screen as in a portable handheld device 10.

A user frames a voice or touch based query by first selecting a primary context search verb as in display 30A, and then makes a voice or touch based query using one a secondary context search term as in display 30B. Then under these two context selections the user voices in voice-mode only a free-form query as displayed in display 30C. This human articulated query as displayed in display 30C, with its context verb and search term, is processed by the interface processor 12 first and then by a search processor 14 to return a response to the query from one of the three databases as had been described earlier and would be described later as well.

An interface function in the interface processor 12, it is believed, by providing a voice or touch based selection from hierarchical context based search sequence and then a free form voice query makes for an efficient human voice interface with computer systems for searching and accessing relevant information from vast amounts of information.

As illustrated in Items 2A-3 and 2B-2, with the visual aid 30C, the voice based query is converted to text and displayed on the top of the screen. The screen for the display of the result is preferably divided into two distinct areas 31A on the top and 31B on the bottom of the screen. The top area is used to display the query and the bottom area is used to display the query response.

Figure 2C:
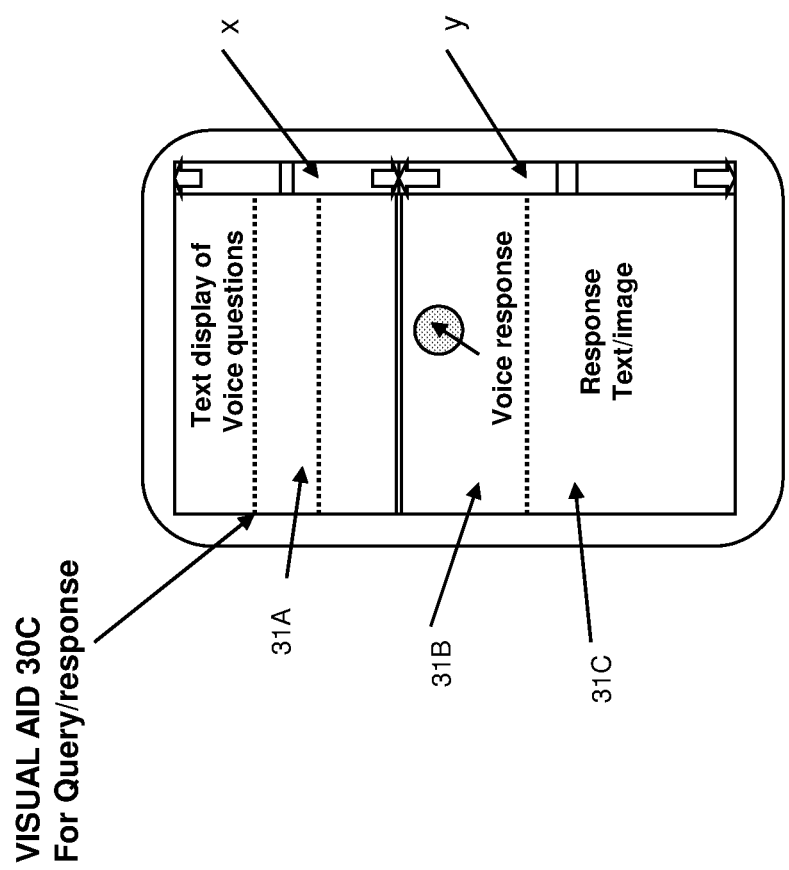
FIG. 2C is a block diagram that illustrates features of the context driven interface screen for a query dialogue.

These features are further illustrated with the help of FIG. 2C. The query itself in text form is displayed on the top area 31A. The response from the search processor 14 is displayed or voiced or a combination of both on the bottom half 31B of the screen. The bottom half 31B further has two areas 31B and 31C, where 31B is used to display voice response symbol and area 31C is used to provide a text or image or a combination of text and image. The voice response area 31B may display a symbol for voice response that may flash when the voice response is actually being delivered. This order of display of areas 31A, 31B and 31C could be reversed and be in any order. As one example, response is on the top and the query is at the bottom.

A sequence of queries in the form of a dialogue may also be displayed, where the search processor would seek a further clarification of the free-form query. Such a dialogue may use either voice or text display or a combination of both voice and display. Scroll bars x and y on both the screens areas 31A and 31B respectively are provided to be able to view a sequence of queries and their responses. These scroll bars may be independent or they may be linked. When they are linked, scrolling either screen displays the related query or the response for the query so that the user can easily relate to or comprehend the query-response pair in a sequence of such query-response pairs. When the scroll bars are not linked, a user may scroll either screen 31A or 31B independently to see the prior queries and prior responses. These features are intended to provide a level of convenience that would save time for a user in figuring out the queries and their responses that already exist in the temporary memory or the local database 18D of the device 10.

The areas 31A and 31B may be soft partitioned into multiple areas so that a sequence of such query-response dialogue may be displayed in text form on the device display for the user to quickly know what has been searched and where the user is in the refinement of the search dialogue.

The response from the search processor may be voice only, voice converted to text display, and/or combined with an image display. A typical illustrative query under SHOP/BUY search verb may be "show me the pictures of dresses of a given brand from a give store in a given selection for size and colors", where the SHOP/BUY is the primary search verb, women dresses may be secondary search term and "show me the picture of brand Taylor dresses from store Fashion" may be the free-form voice query.

Figure 3A:
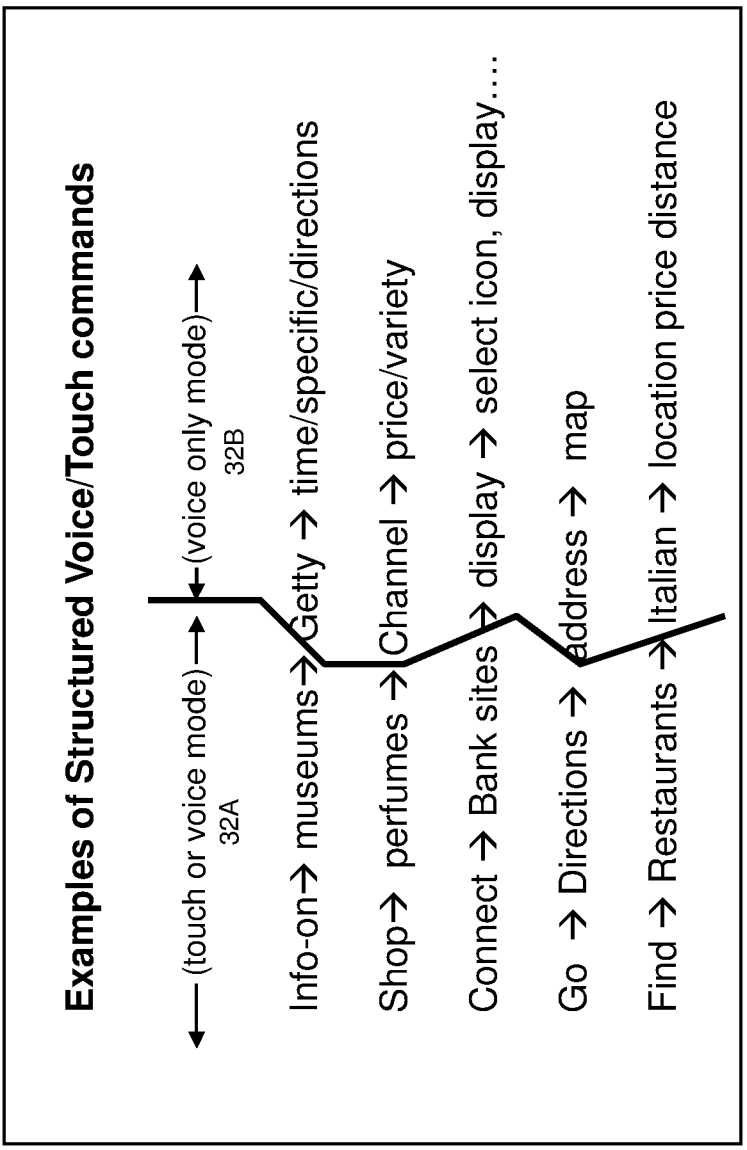
FIGS. 3A and 3B are block diagrams that illustrate features of embodiments of the context based search query and the use of the cloud based databases.

FIG. 3A illustrates the interface feature of the embodiments herein by identifying which part of the query is either touch or voice based 32A and which part is only voice based 32B and illustrates some examples of the types of queries under the primary and secondary sequence of search verbs and terms.

The part of query that defines the context of the query is either voice or touch or a combination of both depending on a user's preference. The user can change between the voice/touch modes any time for any query even in the middle of the query. This part of query enables a quick selection among a limited set of clearly identified choices and is believed to be the most efficient form of interface for this limited purpose of identifying the context of a free form voice-based query.

After the context of the query has been identified as above, the interface enables a free-form voice-based query. Such a free form voice-based query is likely to be in the form of a phrase or a sentence and only a voice-based query for this part of the query is believed to be the most efficient as it would be easier to voice a long query than type it. Further, different people may express or voice a voice query differently.

The interface processor 12 places no restriction on how to articulate a query as logic described later describes how such a free form voice query is processed before being routed to a search engine either in the device itself or the cloud. As later described with reference to FIG. 5A-D, an articulated query is turned into an expanded query with the help of a synonym, culture, and world intelligence dictionaries. Further the query is confirmed or refined as also explained later with reference to FIG. 5A.

Figure 3B:
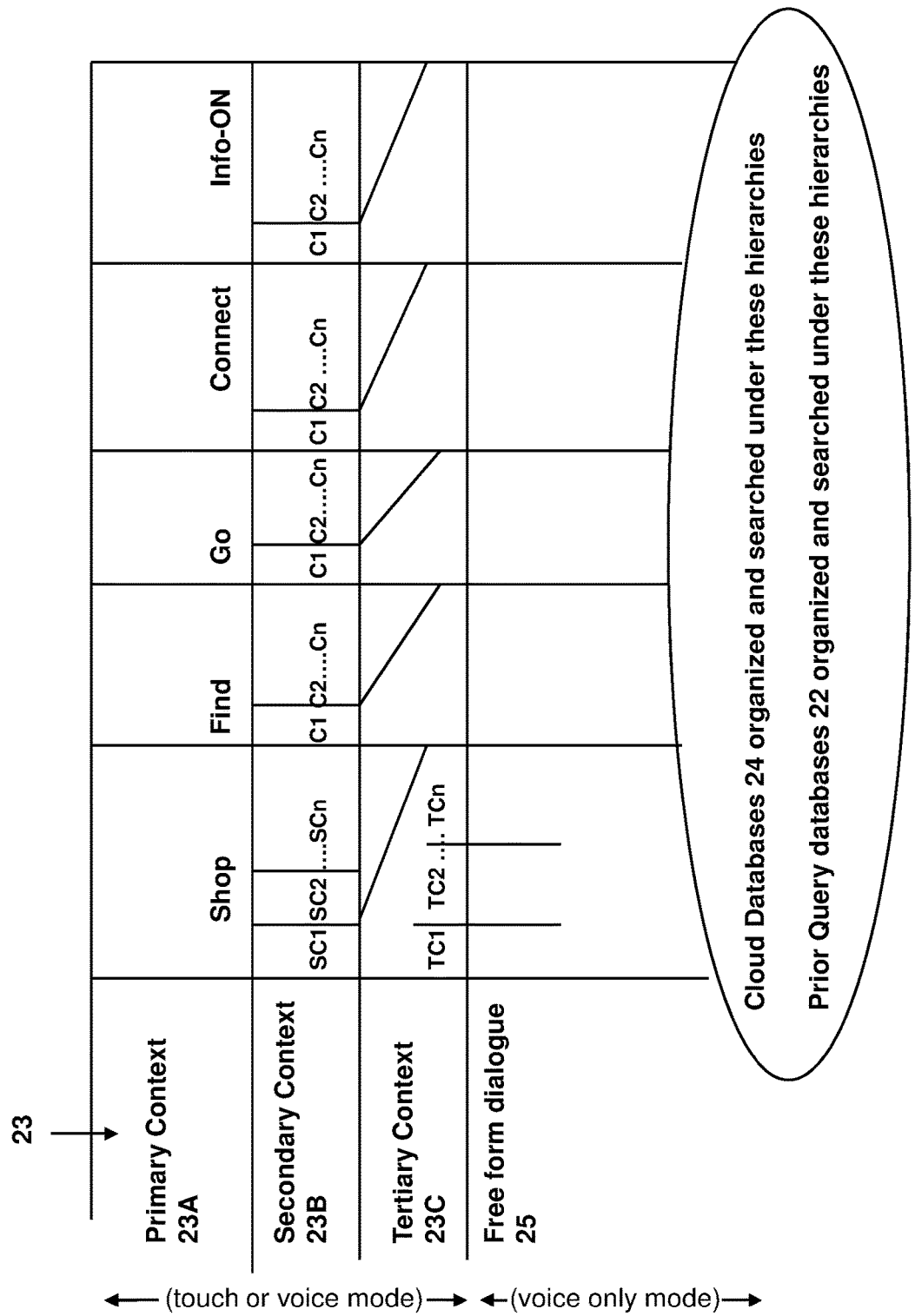

FIG. 3B is another simplified illustration of the interface concept as in FIG. 3A where the context terms 23 under a hierarchy determine which of the many prior query databases 22 or cloud databases 24 would be searched under a given sequence of context terms 23A, 23B and 23C.

There may be three hierarchical context terms, called primary 23A, secondary 23B and tertiary 23C, before a free-form query 25 would be voice-input to the computer system. It is believed, by parsing a general purpose query under such a hierarchy provides a faster search and response by limiting the databases that would be searched, under the sequence of such context terms.

Assuming primary context verbs to be five, secondary context terms to be limited to 12 and tertiary context terms to be again limited to 12, provides for 5×12×12=720 degrees of granularity in identifying the appropriate database to be searched. Of course, these databases may have duplicate content as some of the responses may be common under different search contexts.

In practice the number of secondary and tertiary search terms may be much less than 12 such as 5 or 7 or 9 depending upon the breadth or scope of the subject areas to be searched. These are suggested examples and the number of such search terms may be less or more then these numbers. The use of tertiary search terms may depend on the size and or complexity of each of the secondary search terms.

The interface processor 12 and the search processor 14 take into account what would be an optimum human interface with a computer system and cloud based data depositaries. That is why a series of predefined search terms under a hierarchical context scheme have been created in the embodiments described herein for a user to quickly and efficiently form a voice-based search query without knowing in advance the different search terms and scope of the data that may be present in the data depositaries.

These hierarchical search terms may be selected by a user by a combination of either voice by seeing the display or via voice by human memory, or by display touch on the device screen, in any order. That is, as an illustrative example, the first context may be spoken; the second context may be via touch. As soon as the Interface processor 12 detects a selection of the primary search verb, the display automatically changes to display the secondary search terms and is ready to receive a voice based query based on one or more items of the secondary search terms.

Search Processor 14

As illustrated with reference to FIGS. 1A and 1B, the handheld wireless communication device 10 has a search processor 14. The search processor 14 operates from the device memory and executes in the device processor, in conjunction with a device library and a cloud interface 20 in the device.

The search processor 14 receives a query from the interface processor 12 along with the context terms. The search processor 14 using the context-based query received from the interface processor 12 first searches device local libraries 18D and then via a cloud interface searches cloud based databases 22 and 24 and sends the results of the search to the interface processor 12.

An interface function in the interface processor 12 annunciates results in voice or displays text/image response on the device screen or in a combination of voice response and text/image display. Thereby the interface function in the interface processor 12 provides an efficient interface for access to information databases via a search function in the search processor 14.

The cloud interface 20 in the device 10 connects to a cloud service with a query record and saves the received result in the device local library 18D. The interface function saves the context search sequences in a device local library and on a fresh voice-based query that matches a previous sequence in the device local library and on finding the same context search query jumps to the query and displays on the device screen the query and the answer along with a list of other queries and their answers. The display of the list enables the user to touch or voice select a specified query by a list item number to display the previous received responses to the query.

The device local library 18D saves prior retrieved information that is organized along context search verbs and search terms. The interface processor 12 enables a sequence of voice-input based queries under the selected sequence of search terms, with a cloud service, for efficiently interacting with information data depositaries in the cloud service.

Mode of Operation

A typical user, in an illustrative example of the embodiments, would speak a code such as "SEARCH" to the device. The device OS would recognize this voice command and launch the Interface Function. The interface function would display the primary context verbs on the device display in a boxed order as in item 2A-1 to be easily discernible and comprehensible to an ordinary user.

On seeing this display as in item 2A-1, the user, either by memory or seeing the different options, either touch select or voice the primary context verb. Immediately the interface function would display the corresponding secondary search terms in a list, as in item 2A-2, with an option to touch R or speak Return. The user would see the secondary search terms, as in item 2A-2 and select one of them either via touch or speak the term.

The interface function would then immediately display the search response screen, as in item 2A-3 and begin text type the query as it is spoken. When the query that is spoken is complete, the user would speak a code word search as "GO" and that would instruct the device OS to launch the search processor function and a search wait icon (not shown) would be displayed on the response area of the screen as in item 2A-3.

A response that is received would be annunciated by a combination of voice and display of text or image in the response area of the screen as in item 2A-3. This enables the user to engage in further free-form query dialogue to further refine the query, until the desired results are annunciated. The sequence of queries and dialogues is saved in the local library 18D of the device 10, for a user to refresh or continue further new searches.

Further illustrative examples, as in FIG. 3A are shown. In the first of these examples, a use would select Info-on, then museums, then Getty and then speak his specific query. In second of these, a user would select Shop, then select perfumes, then brand and speak a query to determine price, variety and availability at a local store. In third of these, a user would select Connect then select Bank site, and then free form speak the specific bank query. In fourth of these, a user would select GO, and then Directions, then speak the address to get a map and directions. In fifth of these, a user would select Find, then select restaurants and then Italian and then speak the specific query.

Figure 4:
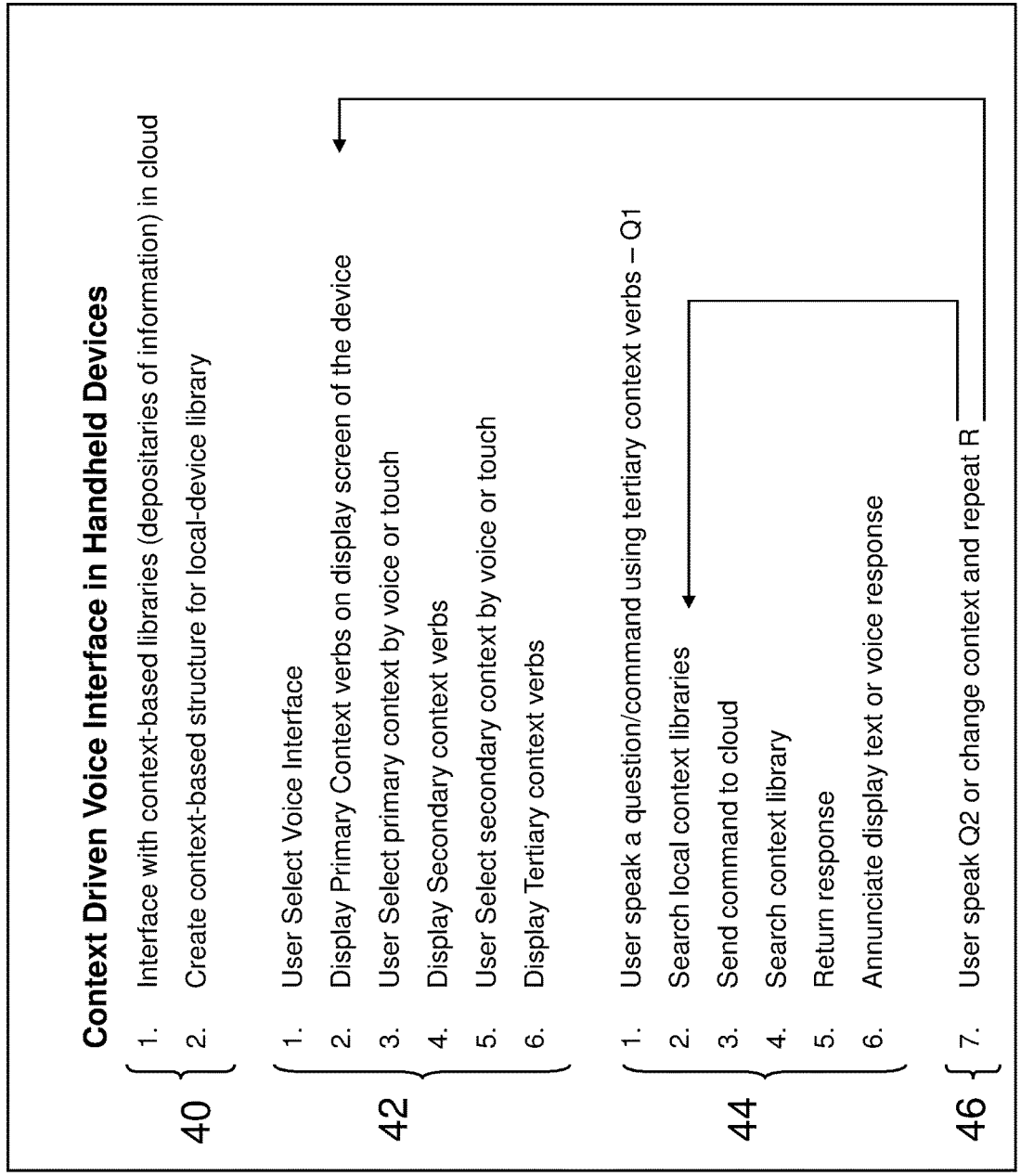
FIG. 4 is a method diagrams that illustrate typical steps in the logic of the embodiments described herein.

FIG. 4 illustrates a sequence of process operational steps. Under step 40, used for prepping the device 10 operating system
 1. Device interfaces with context-based libraries (depositaries of information) in cloud
 2. Device creates context-based structure for local-device library.

Under step 42,
 1. User Select Voice Interface
 2. Display Primary Context verbs on display screen of the device
 3. User Select primary context by voice or touch
 4. Display Secondary context verbs
 5. User Select secondary context by voice or touch
 6. Display Tertiary context verbs Under step 44,
 1. User speak a question/command using tertiary context verbs—query1
 2. Search local context libraries
 3. Send command to cloud
 4. Search context library
 5. Return response
 6. Annunciate display text or voice response Under step 46,
 User speaks query2 or change context and repeat Return (R)

Free Form Voice Query

Figure 1B:
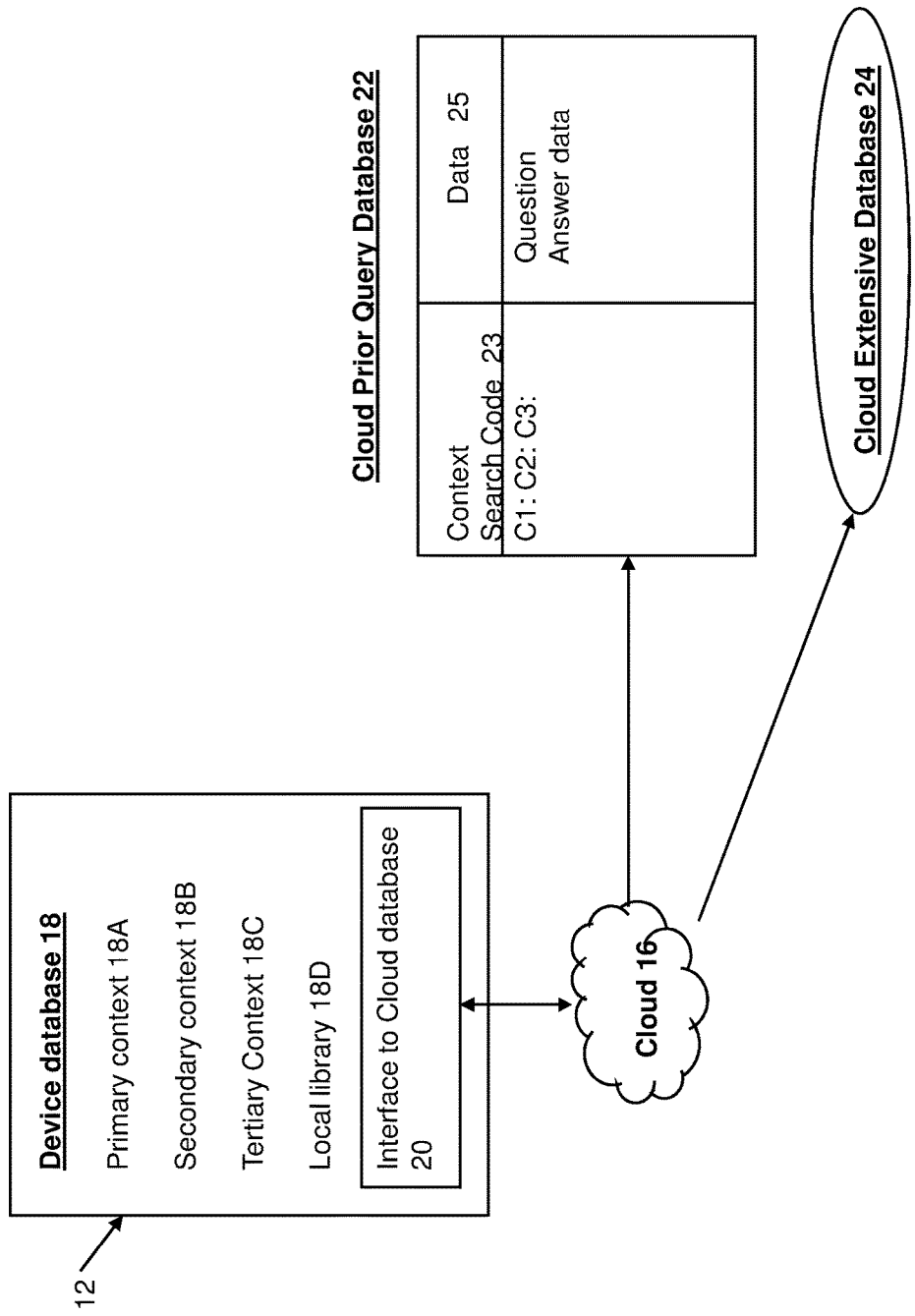

After the query context is selected, as had been explained earlier, a free form voice query is received by the interface processor 12 as in FIG. 1A. A functional diagram for processing a voice-based query is illustrated with the help of FIG. 5A.

Figure 5A:
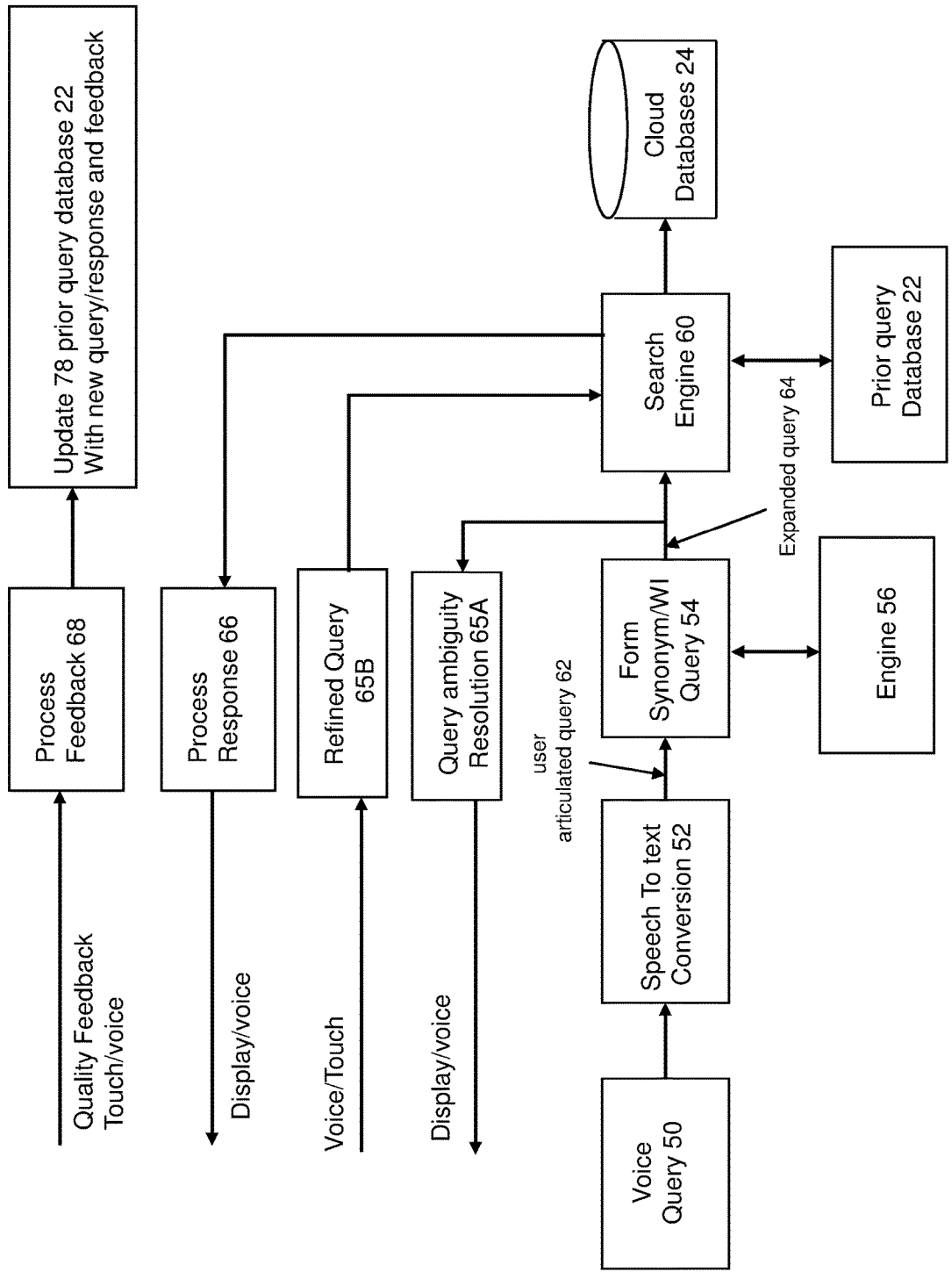
FIGS. 5A-5B are functional block diagrams that illustrate different functions of the embodiments.

As illustrated in FIG. 5A, in function 50, a free-form voice query 50 is received. In function 52, the query is converted to text using prior art speech to text conversion. In function 54, the human articulated query 62 is expanded to be an expanded query 64 using engine 56. The details of engine 56 are described with reference to FIG. 5B.

Figure 5B:
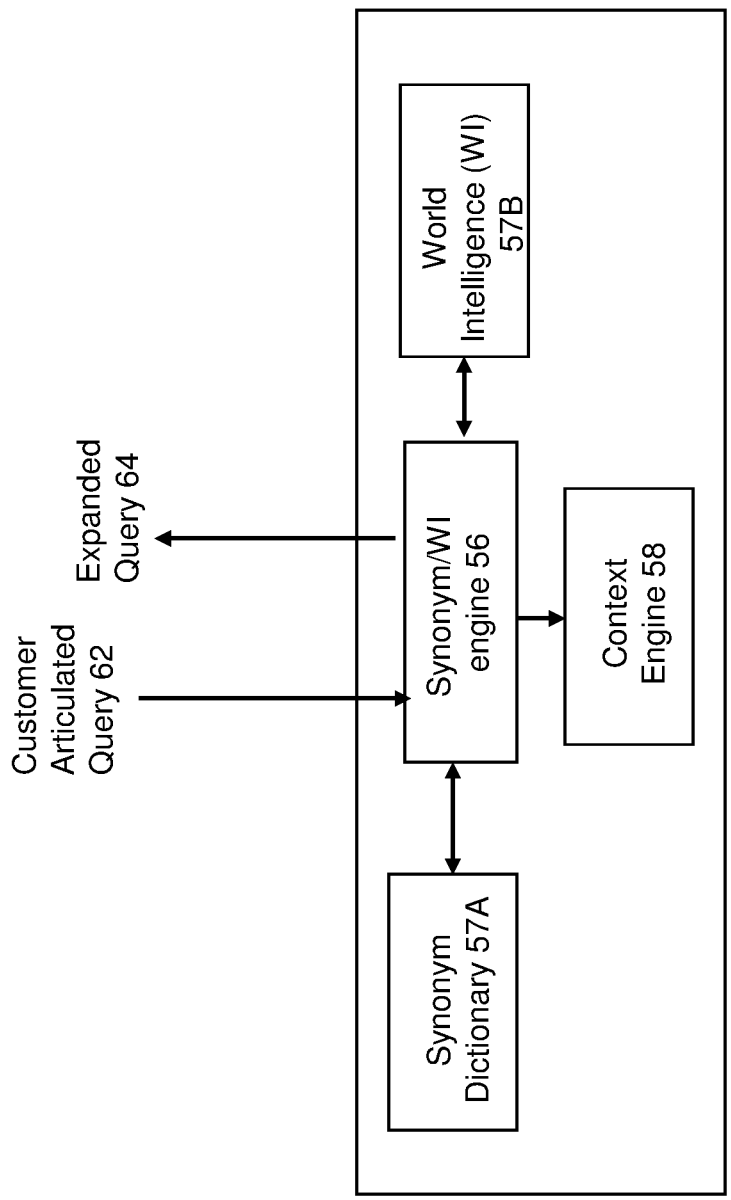

As illustrated in FIG. 5B, engine 56 receives from function 54, the spoken query along with the context hierarchy, or known as customer articulated query 62. The Engine 56 using the context engine 58, synonym dictionary 57A and world intelligence (WI) dictionary 57B, creates an expanded query 64 which is returned to function 54, as in FIG. 5A.

As illustrated in FIG. 5A, function 54 sends the expanded query 64 to function 65A for query ambiguity resolution back to the user via display and voice and receive via function 65B receive a refined or a confirmed query. The expanded and then refined or confirmed query is then sent from function 65B to search engine function 60.

The search engine 60 follows two different paths for performing query answer search. The first path is to search the prior query databases 22, which are also organized in context hierarchy. It is believed that the number of different free form queries would be limited and would be repeated from a population group. Hence a prior query and answer databases 22 are maintained to quickly find the query and its answer from one of these databases. If a similar query is found, an answer is processed and quickly delivered via function 66. The second path is that if an answer is not found in prior query databases 22, the query is sent by the search engine function 60 to cloud databases 24.

When a query answer is received from the cloud database 24, the answer is again processed and delivered to user via function 66. As has been illustrated earlier, with the help of FIG. 2C, the screen of device 10 has been partitioned into two parts, a top part and a bottom part. The top part reproduces the query and the bottom part either displays a response or voices a response or a combination response of display and voice so that a user can both visually see/read the text and photos as well as have the option to hear the voice. The user then has the option to provide a feedback via function 68 on the relevancy of the answer. If the answer is relevant, in function 78, the query/answer is copied in the prior query databases 22. If the answer is not relevant, a user is requested to refine the query by voicing another query.

Synonym, Culture & World Intelligence Engine

The complexity of human voiced queries with differences in their dialects, choice of words, and spoken styles across cultures creates a difficulty in matching what the human spoke and what he/she meant as would be relevant to a search. To address this issue, a concept of expanded search query is described that expands the originally spoken search words into their possible synonyms driven by culture and style and combined with world intelligence or worldly knowledge.

FIG. 5B illustrates expansion of a search query based on using a synonym, culture, and world-intelligence dictionaries into an expanded search query 64 for the search engine 60. The concept of synonym 70, culture 72 and WI 74 dictionaries is illustrated with reference to FIG. 5C.

FIG. 5D illustrates simplified examples of articulated queries 62 that have been expanded into expanded queries 64 using the three different dictionaries as describe in FIG. 5C

The dictionaries as illustrated with the help of FIG. 5C are stored in the device local library. That is the device local library 18D stores a synonym dictionary 70, a culture dictionary 72 as well as a world-intelligence dictionary 74. These dictionaries are used in a free form search query to create alternate queries that are used for a more efficient search.

Method of Operation

Figure 6:
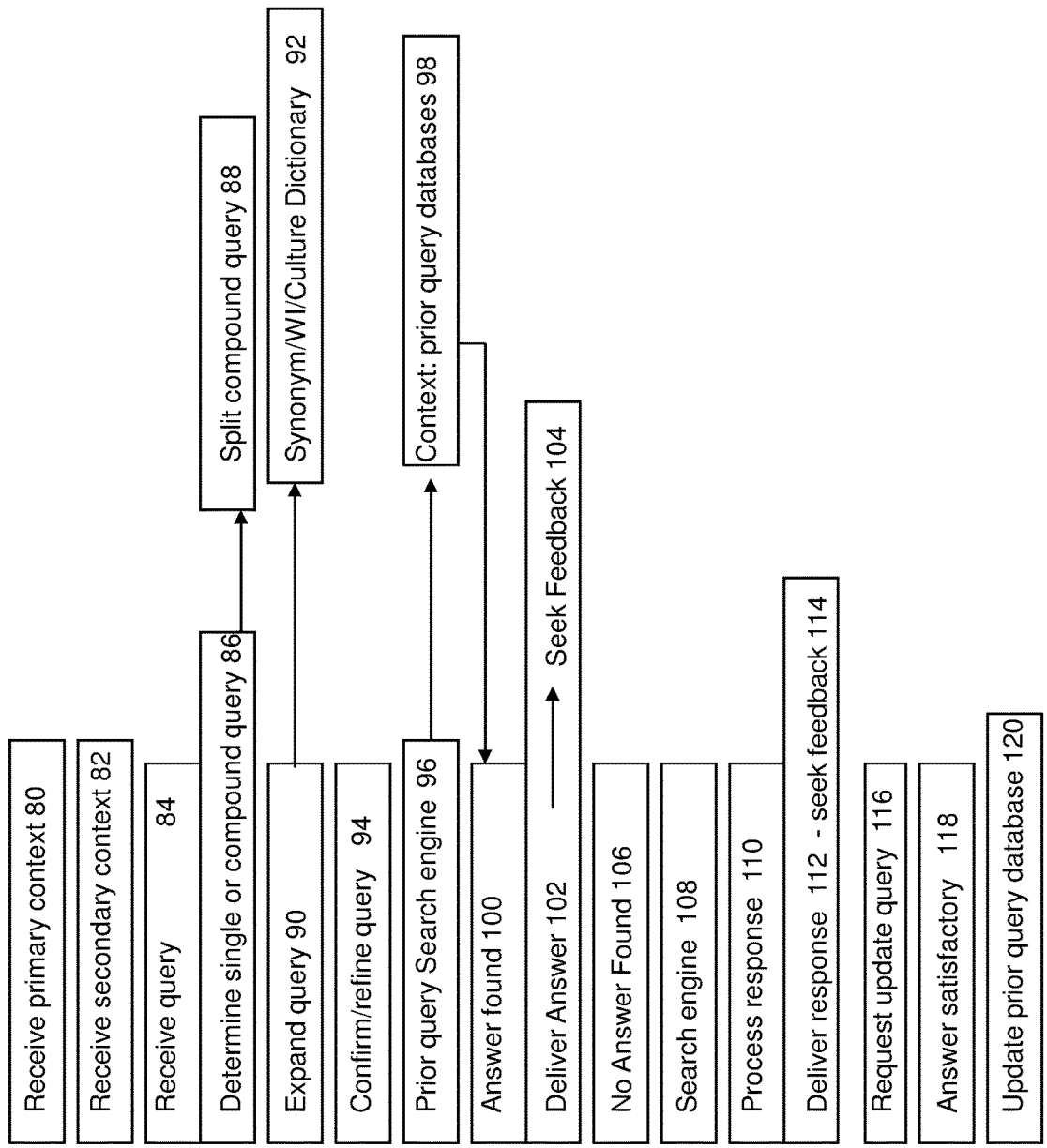
FIG. 6 is a method block diagram that illustrates operation of the embodiment.

As in FIG. 6, a process diagram is illustrated, where not all the steps may be used or used in the order specified.

At step 80, primary context is received, at step 82, the secondary context is received and at step 84 the free form voice query is received by the interface processor 12 from a user.

At step 86, a query is checked for a compound query and if a compound query, at step 88 the query is split. At step 90 the query is expanded. At step 92 the query expansion is performed with the dictionaries. At step 94 the expanded query is confirmed or refined.

At step 96 the search engine is used to search for a prior query. At step 98, the prior query databases 22 using query contexts is searched. At step 100, the answer is found in prior query database 22 and at step 102 deliver the answer in both text/picture and voice. At step 104, seek user feedback on the relevance of the response to the query.

At step 106, no answer is found, then at step 108 search engine queries to cloud database are sent.

At step 110, the query response is processed for display or voice mode or both. At step 112, the response is delivered and at step 114, a feedback is sought. At step 116, if feedback is negative, an update query is received. If at step 118, if answer is satisfactory, then at step 120, prior query database is updated.

Figure 7:
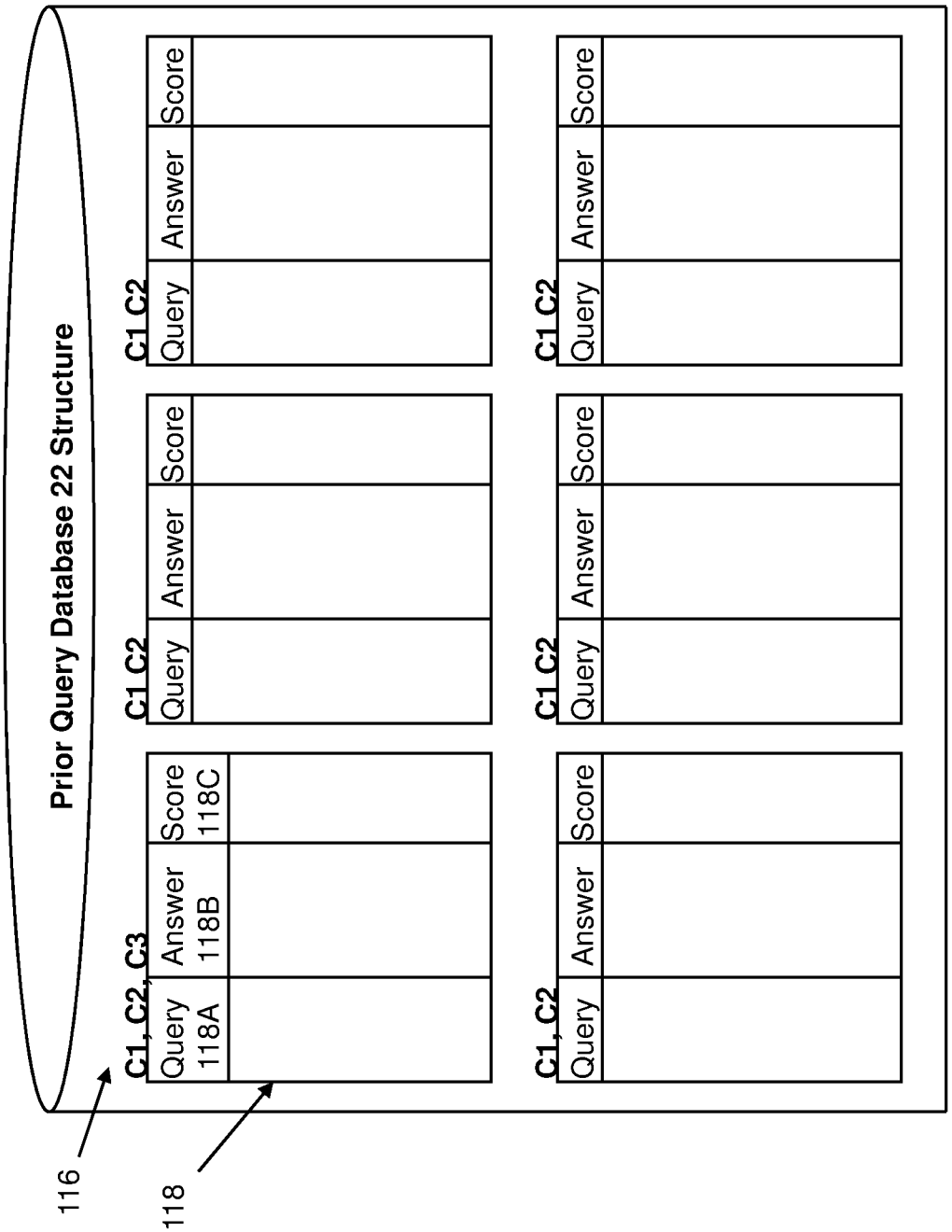
FIG. 7 is a block diagram that illustrates embodiment of prior query databases.
Figure 10A:
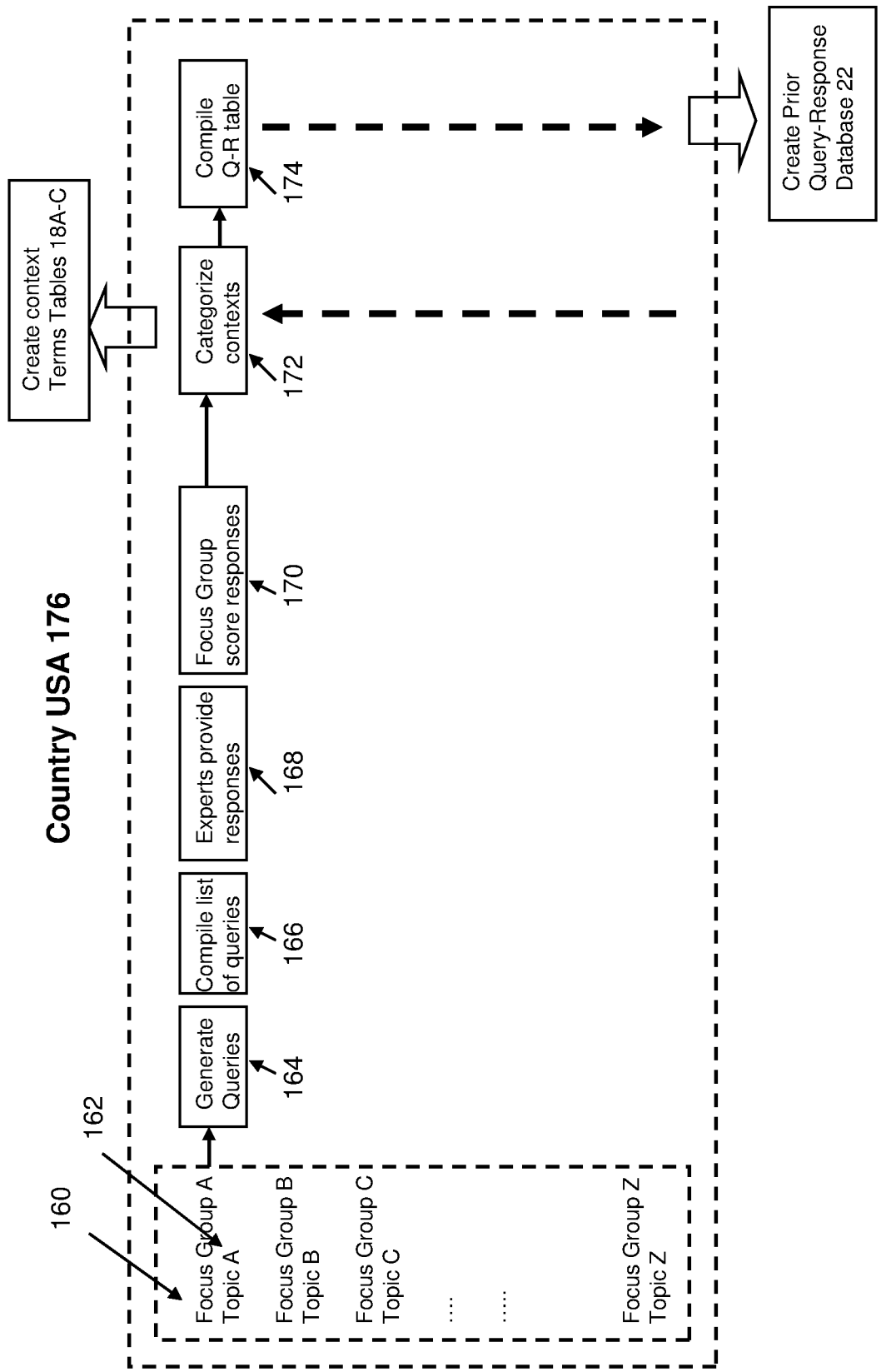
FIG. 10A-B-C is block diagrams that illustrate process of creating prior query databases and search context terms.
Figure 10B:
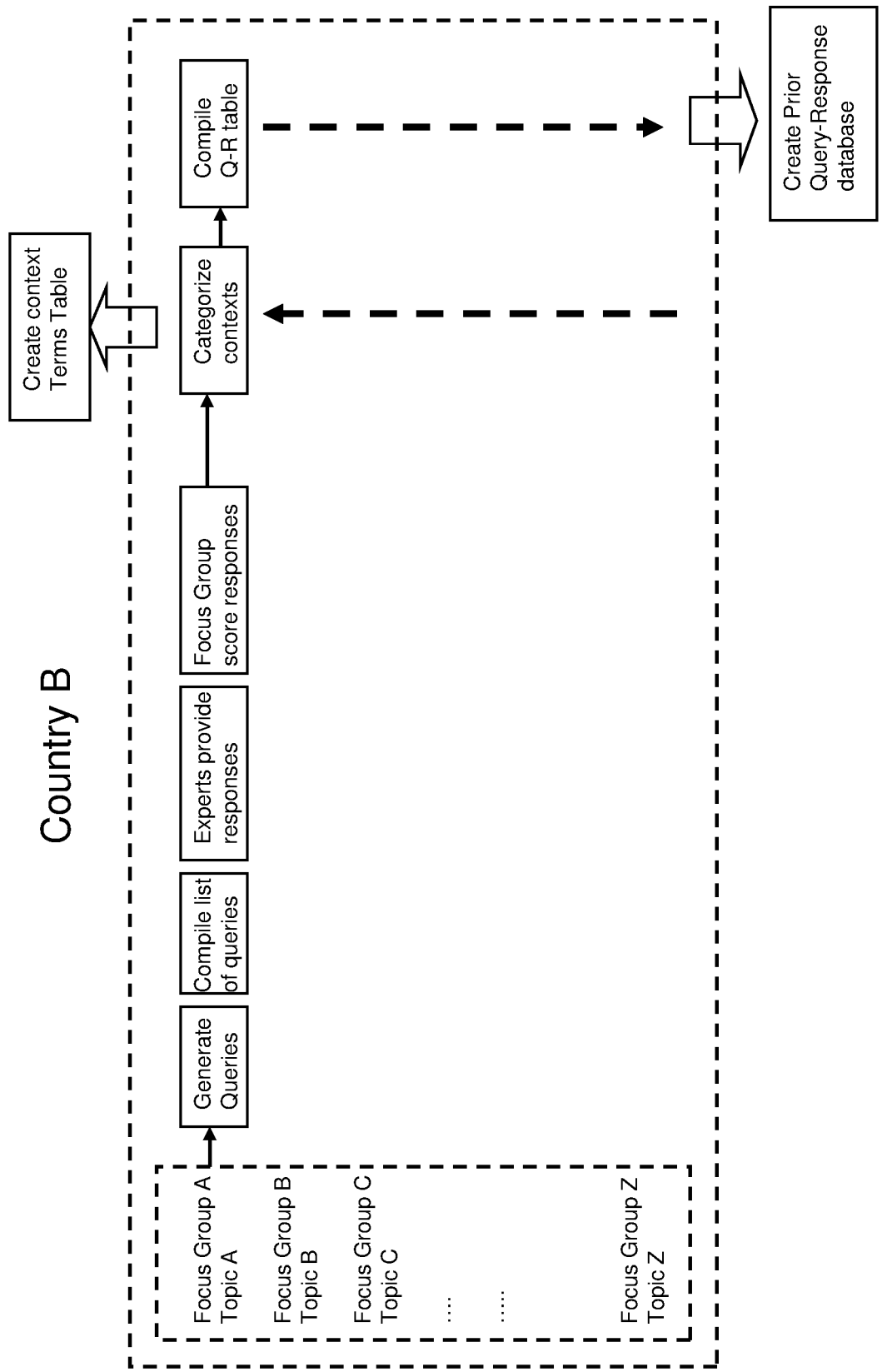

FIG. 7 provides a simplified illustration of the prior query database 22 structure. The prior query database 22 is structured in many tables 118, each table for a given set of context terms 116. Each table 118 lists a query 118A and its response 118B and a relevancy score 118C in terms of how useful the response is to the user. The number of such tables may be in the hundreds and organized under the context terms C1, C2 and C3. The context terms are illustrated later with the help of FIG. 10C, while FIGS. 10A and 10B illustrate the creation of the prior query database and the determination of the context terms.

Over time with the refinement of queries and their responses, the relevancy score may approach closer to a maximum of 100%, while it may start out at less than or more than 50%. A graphical user interface (GUI) may be used to elicit this score from a user and may provide choices of less than 50%, more than 50%, more than 60%, more than 75% and more than 90% etc.

In summary, a query is first resolved against the local database 18D, and if response not found, against the prior query global database 22 and if response not found then against the cloud database 24. The local database 18D and the prior query databases 22 are updated based on the query and responses that are retrieved and processed from the cloud database 24.

The second level is prior query databases based on prior queries of others and are also maintained in the cloud servers. The third level is query database that is maintained in the local device. The last two of these three databases are structured in query response structure, while the first is the depositary of all information organized as are prior art databases along topics, subtopics and their keywords.

Figure 8A:
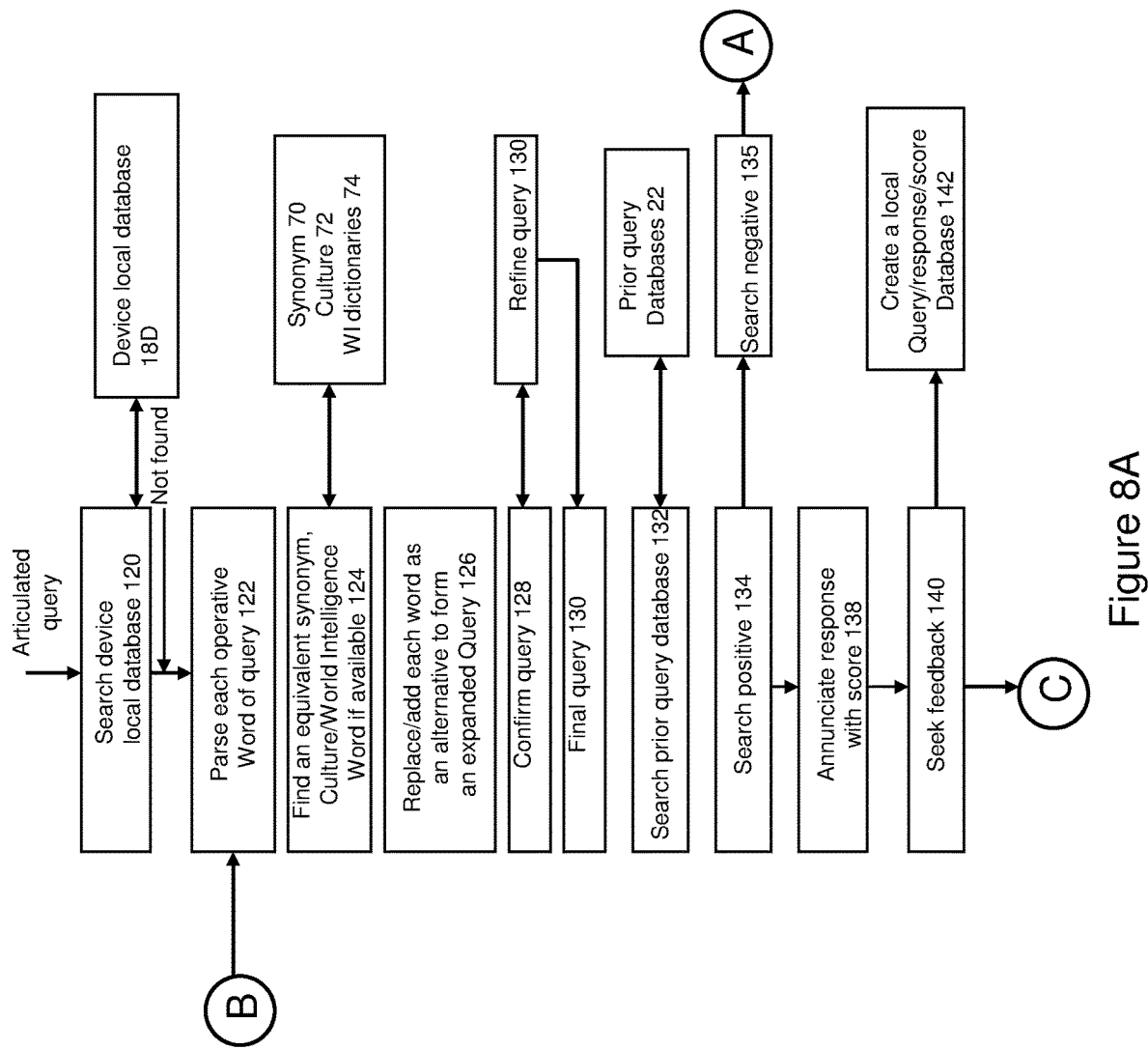

FIG. 8A-B illustrates a flow diagram of the voice-based query. This is a single figure shown as two separate FIGS. 8A and 8B for convenience.

At step 120, a query is first resolved against the local database 18D. At step 122, each operative word of a query is parsed. At step 124, for each operative word, an equivalent synonym, is searched using dictionaries 70, 72 and 74. At step 126, each operative word is expanded with the alternate word to form an expanded query. At step 128 the query is confirmed and step 139 if required the query is refined. At step 132, prior query database 22 is searched. At step 134 the search is positive and at step 138 the query response with the relevancy score is annunciated. At step 140, a feedback is sought and at step 142 the local database 18D is updated.

At step 136, the prior query database search is negative. At step 144, cloud databases are searched. At step 146 the response is processed. At step 148, the response is annunciated. At step 150, a feedback is sought. At step 152, prior query database 22 is updated with the new query-response pair. At step 154, a second or a follow up query is invited from the user.

Figure 9:
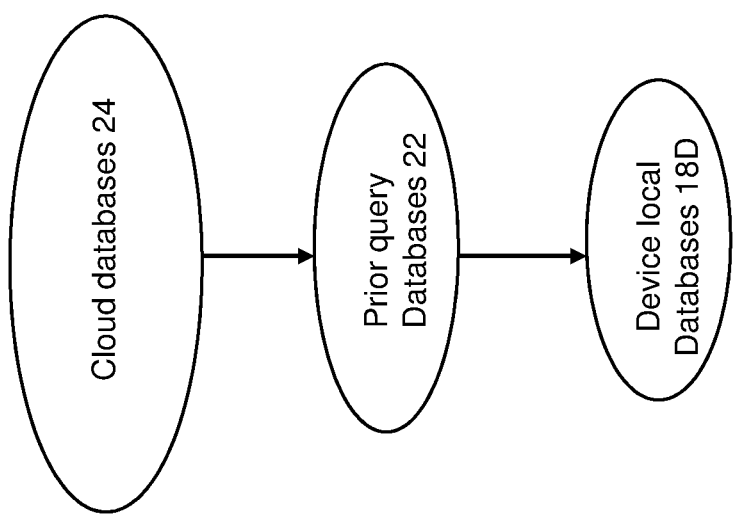
FIG. 9 is a block diagram that illustrates operation of the hierarchy of databases and movement of data flow between databases.

FIG. 9 illustrates the relation and hierarchy of the databases used in the embodiments and that are used to support the voice queries. To optimize the voice based search response query, the structured queries of the embodiments herein use a hierarchy of databases. The topmost hierarchy is the cloud database 24. This database is the master set of all data that may be ever used to answer a query and best maintained in the cloud databases. These databases are likely to be scattered as they are in prior art across a large number of serves accessible over a global computer network.

Prior query database 22 is positioned as the second database in this hierarchy and the device local database 18B is the third database in this hierarchy. FIGS. 10A, 10B and 10C illustrate a process and logic to arrive at a prior query database 22 and search context terms 23A, 23B and 23C for use with the embodiments herein As illustrated with reference to FIG. 10A, a large number of focus groups 160 are created for a range of topics 162. Each focus group 160 may have as many as ten to one hundred people. Each group 160 is selected for a topic 162. The list of topics may be varied and large and depend upon the common and not so common interest of people on which they are likely to seek answers and form queries.

The list of topics, as a simplified illustration, as illustrated in FIG. 10C, may include, travel 180A, entertainment 180B, food 180C, restaurants 180D, money 180E, employment 180F, stocks 180G, shop sites 180H, school work 180I, college 180J, and many more. Each of these topics may have hierarchy or levels of focus groups if the topic is amenable to such hierarchy or subtopics.

As illustrated in FIG. 10A, at step 164, the focus group 160 generates queries on topic 162 via group brainstorming session. At step 166 a list of such queries is compiled. At step 168, a group of experts in topic 162 provide response to the queries on the compiled list of queries. At step 170, the compiled query response lists are shown to the focus group 160 for them to score each response for being relevant to the query. The compiled query-response table is added to with these relevancy scores.

At step 172, from these queries, a large selection of topics is used to create a list of hierarchical context terms. These are then used to create tables 18A, 18B and 18C. At step 174, the query-response tables are compiled to create query database 22.

Similar process as described with the help of FIGS. 10A and 10C may be performed for each country such as country B as in FIG. 10B. The outcome of the process is a list of context search terms 18A-18C and query response tables organized along these search context terms in a prior query database 22.

A wireless communication device with a voice-input and display-touch interface has a handheld wireless communication device has a user voice/touch interface processor. The interface processor operates from the device memory and executes in the device processor. The interface processor has an interface function that enables, in part (i) an either display-touch or a voice-input based interface, and in part (ii) only a voice-input based interface.

The interface function, (i) in display-touch or voice-input interface part, displays primary context search verbs on the device screen for a device user to make a touch/voice selection there from, then the interface function displays secondary context search terms on the display screen for the user then, (ii) in only a voice-input interface mode, to voice a free-form query under the selected sequence of context search verb and the search term, thereby the interface function provides a user an efficient interface for searching information databases with free-form voice queries.

The interface function as in c), in display-touch or voice-input based part, in addition displays tertiary context search terms, enabling the user then to voice only the voice-input based search free-form query under the selected sequence of context search verb and search terms.

The handheld wireless communication device has a search processor, the search processor operates from the device memory and executes in the device processor, in conjunction with a device library and a cloud interface in the device. The search processor using the context-based query searches device local libraries and cloud based databases and annunciates results in voice or displays text/image response on the device screen or in a combination of voice response and text/image display, thereby the interface function provides an efficient interface for access to information databases.

The cloud interface connects to a cloud service with a query record and saves the received result in the device local library. The interface function saves the context search sequences in a device local library and on a fresh voice-based query that matches a previous sequence in the device local library and on finding the same context search query jumps to the query and displays on the device screen the query and the answer along with a list of other queries and their answers, The display of the list enables the user to touch or voice select a specified query by a list item number to display the previous received responses to the query. The device local library stores prior retrieved information organized by context search verbs and terms.

A voice-input based or a display-touch input to the device launches the interface processor and its interface function in the device. The interface processor enables a sequence of voice-input based queries under the selected sequence of search terms, with a cloud service, for efficiently interacting with information data depositaries in the cloud service. The number of primary search verbs is limited to be from 3 to 7 and the search verbs are visually displayed in boxes on the device display. The number of secondary search terms is limited to be equal to or less than 12 and visually displayed in a list form on the device screen.

1. A method of voice-touch-command-based-interface for interfacing with a search engine has the steps, where all the steps may not be used or used in the order stated has the steps:
   a. selectively displaying as a visual aid a primary list of available items to select from on a display screen;
   b. voicing or touching, as a user option, one of the items to select the item from the primary list and displaying on the display screen, based on the voice or touch selection, a secondary list of select items;
   c. voicing or touching, as a user option, one of select items from the secondary list to make a search query from the sequence of the voice or touch selected items for an efficient voice and touch interface to a search engine.
   d. resolving the search query into an expanded search query using a synonym and a world intelligence dictionary.
   e. using subsequently only free-form voice command within the search context determined by the primary and the secondary list selections.
   f. limiting the number of items in the lists to a number that a user can comprehend in a limited span of time.
   g. displaying text of the query as it is voice-input on the display screen as a visual aid to confirm the search query.
   i. expanding the articulated query with a culture and a world intelligence dictionary to be an expanded query.
   j. confirming and refining the expanded query by the user by displaying a text version of the query on the display screen.
   k. displaying not optionally the lists on the display screen, where a user by prior repeated voice use of items on the lists has memorized the contents of the first and second lists and can voice form the search query without visual aid of the display of lists on the display screen.

A method of processing a human articulated query has the following steps where all the steps may not be used or used in the order specified:
   a. receiving a voice-input human articulated search query;
   b. maintaining a culture dictionary and a world intelligence (WI) dictionary in a device capable of processing human articulated query;
   c. parsing key operative words of the human articulated query and substituting each operative word with an alternate list of words from the WI dictionary and the culture dictionary to form an expanded query for use with a search engine.

d. searching first the expanded query with a prior query database and then searching with a cloud general database;

e. processing the search results for use as a text, image and a voice of the text.

A method of creating prior query search databases, for searching responses to voice driven queries in mobile wireless device applications, having the steps where all the steps may not be used or used in the order specified:

a. forming a plurality of focus groups for a plurality of topics.

b. each focus group generating queries based on their experience.

c. having experts provide answers to the queries and focus group members assigning relevancy scores to the answers.

d. compiling the query responses in tables along a set of context terms for creating a database of prior query response to speed up response to voice queries to a wireless mobile device.

e. storing the prior query database in a cloud database;

f. retrieving tables from prior query database to a local device memory as required to support efficient searches.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A system for processing a human articulated search query to a computing and communication device, the system comprising:

the computing and communication device has a CPU, a memory, a plurality of interfaces, including at least, a display, a touch screen, a microphone, a speaker, a plurality of radio frequency transmitters and receivers to wireless networks, a storage with a plurality of databases, wherein the databases maintain at least a culture dictionary, a world intelligence (WI) dictionary, and a prior search query database, and a logic stored in the memory and executing in the CPU, wherein the logic provides access to the plurality of databases;

a query response table stored in the prior search query database comprising queries, answers to the queries and relevancy scores, wherein the query response table is populated with results from a plurality of focus groups for a plurality of topics, including queries generated by the focus groups, answers to the queries are provided by experts and relevancy scores assigned to the answers by focus group members, wherein the answers are scored by the focus group members for relevancy to the query;

the logic has a receive function for receiving the human articulated search query and temporarily stores a digital transformation that can be understood by a computer, of the search query in the memory;

the logic receives, prior to receiving the human articulated search query, a plurality of search context terms, wherein the logic uses the search context terms to search the prior search query database, and wherein the logic is capable of receiving the search context terms from the touch screen;

the logic parses the words of the human articulated search query to identify culture words and uses the culture dictionary and the WI dictionary to map culture words to form an expanded search query for use with a search engine.

2. The system as in claim 1, comprising:

the logic parses key operative words of the human articulated search query and substitutes each key operative word of the search query with an alternate list of words from the culture dictionary and the WI dictionary to form the expanded search query for use with the search engine.

3. The system as in claim 1, comprising:

the logic has access to the prior search query database that stores prior search queries and their answers, wherein the prior search query database are stored in the device storage itself; and has access to prior search query databases that are stored external to the device in a cloud database accessible to the logic using the wireless networks.

4. The system as in claim 1, comprising:

the logic provides for searching the expanded search query using the search engine, wherein the search engine searches first the expanded search query with the prior search query database in the device itself and then the search function searches the prior search query database stored in the cloud general database.

5. The system as in claim 1, comprising:

the logic processes the search results of the expanded search query for output to the device's interfaces as either a text, an image or a voice of the text, or a combination thereof.

6. The system as in claim 1, comprising:

the logic receives along with the human articulated search query, a primary and a secondary search context term;

the prior search query database maintained in the storage is organized by the primary and the secondary search context terms, wherein the logic uses the search context terms to search the prior search query database.

7. The system as in claim 3, comprising:

the logic receives along with the human articulated search query, a primary and a secondary search context term;

the prior search query database maintained in the cloud database is organized by the primary and secondary search context terms, wherein the search context terms are used to search the prior query database in the cloud database.

8. A method for processing a human articulated search query to a computing and communication device, the method comprising the steps of:

providing the computing and communication device with a CPU, a memory, a plurality of interfaces, including at least, a display, a touch screen, a microphone, a speaker, a plurality of radio frequency transmitters and receivers to wireless networks, a storage with a plurality of databases, wherein the databases maintain at least a culture dictionary, a world intelligence (WI) and a prior search query database, and a logic stored in the memory and executing in the CPU, wherein providing by the logic access to the plurality of databases;

populating the prior search query databases with results from a plurality of focus groups for a plurality of topics, generating queries by each focus group based on their experience, providing answers by experts to the queries and then assigning relevancy scores to the answers by focus group members, wherein the answers are scored by the focus group members for relevancy to the query and are stored in a query response table comprising queries, answers and relevancy scores;

providing by the logic a receive function for receiving the human articulated search query and temporarily storing a digital transformation that can be understood by a computer, of the search query in the memory;

receiving by the logic prior to receiving the human articulated search query, a plurality of search context terms, wherein the logic uses the search context terms to search the prior search query database, and wherein the logic is capable of receiving the search context terms from the touch screen;

parsing by the logic the words of the human articulated search query and identifying culture words and using the culture dictionary and the WI dictionary to map culture words forming an expanded search query for use with a search engine.

9. The method as in claim 8, comprising the steps of:

parsing by the logic key operative words of the human articulated query and substituting each key operative word of the search query with an alternate list of words from the WI dictionary and the culture dictionary to form an expanded search query for use with a search engine.

10. The method as in claim 8, comprising the steps of:

providing in the logic access to the prior search query database that stores prior search queries and their answers, the prior search query database stored in the device storage itself; and providing in the logic access to prior search query databases that are stored external to the device in a cloud database accessible to the logic using the wireless networks.

11. The method as in claim 8, comprising the steps of:

providing in the logic a search function for searching the expanded search query using the search engine, wherein the search function searches first the expanded search query with the prior search query database in the device itself and then the search function searches the prior search query database stored in the cloud general database.

12. The method as in claim 8, comprising the steps of:

processing by the logic the search results of the expanded search query for outputting to the device's interfaces as a text, an image or a voice of the text, or a combination thereof the search results.

13. The method as in claim 8, comprising the steps of:

receiving by the logic along with the human articulated search query, a primary and a secondary search context term;

maintaining the prior search query database in the device storage itself organized by the primary and the secondary search context terms, wherein using by the logic the search context terms to search the prior search query database.

14. The method as in claim 10, comprising the steps of:

receiving by the logic along with the human articulated search query, a primary and a secondary search context term;

maintaining the prior search query database in the cloud database that is organized by the primary and secondary search context terms, wherein using by the logic the search context terms to search the prior query database in the cloud database.

15. The method as in claim 8, comprising the steps of:

compiling the prior queries from the plurality of focus groups along with query responses from the experts and relevancy scores from the focus groups for storing in the prior query database in tables using search context terms, wherein the prior search query database is used to provide response to human articulated search queries to a user of the mobile wireless device.

16. A method of creating and using prior query search databases, comprising the steps of:

providing a mobile wireless computing and communication device with a storage memory for storing prior query search databases, and wherein the prior query search database is populated with results from a plurality of focus groups;

populating the prior query search databases with results from a plurality of focus groups for a plurality of topics, generating queries by each focus group based on their experience, providing answers by experts to the queries and then assigning relevancy scores to the answers by focus group members, wherein the answers are scored by the focus group members for relevancy to the query and are stored in the prior query search databases;

searching the prior query databases for responses to human articulated search queries and search context terms in mobile wireless device applications;

storing the prior search query database in a device's local storage that supports search for the query from the local device; and storing further the prior search query database in a cloud database, wherein the cloud database is accessible over a wireless network using radio frequencies.

17. The method as in claim 16, comprising the steps of:

compiling before populating, the prior queries from the plurality of focus groups and query responses from experts, along with relevancy score in the prior query database in tables using search context terms, wherein the prior search query database is used to provide response to human articulated search queries to a user of the mobile wireless device.

\* \* \* \* \*